(12) United States Patent
Lin et al.

(10) Patent No.: US 9,760,706 B2
(45) Date of Patent: Sep. 12, 2017

(54) METHOD FOR DYNAMICALLY ADJUSTING PROGRAM LOGIN INTERFACE, AND INTERNET TERMINAL

(71) Applicant: Tencent Technology (Shenzhen) Company Limited, Shenzhen (CN)

(72) Inventors: Xianhuan Lin, Shenzhen (CN); Ying Hu, Shenzhen (CN); Hongda Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 6 days.

(21) Appl. No.: 14/752,528

(22) Filed: Jun. 26, 2015

(65) Prior Publication Data
US 2015/0302190 A1 Oct. 22, 2015

Related U.S. Application Data

(63) Continuation of application No. PCT/CN2013/084864, filed on Oct. 9, 2013.

(30) Foreign Application Priority Data

Dec. 28, 2012 (CN) .......................... 2012 1 0586156

(51) Int. Cl.
*H04L 9/32* (2006.01)
*G06F 21/36* (2013.01)
(Continued)

(52) U.S. Cl.
CPC .............. *G06F 21/36* (2013.01); *G06F 21/31* (2013.01); *G06F 21/45* (2013.01); *G06Q 99/00* (2013.01); *H04L 63/08* (2013.01)

(58) Field of Classification Search
CPC .......... G06F 21/36; G06F 21/31; G06F 21/45; G06Q 99/00; H04L 63/08
See application file for complete search history.

(56) References Cited

U.S. PATENT DOCUMENTS 6,014,638 A * 1/2000 Burge .................... G06Q 30/02
                                                            705/27.1
6,134,532 A * 10/2000 Lazarus ............ G06F 17/30867
                                                             705/1.1
(Continued)

FOREIGN PATENT DOCUMENTS

| CN | 101127784 A | 2/2008 |
| CN | 101242377 A | 8/2008 |

(Continued)

OTHER PUBLICATIONS

Tencent Technology, ISRWO, PCT/CN2013/084864, Jan. 9, 2014, 18 pgs.

(Continued)

*Primary Examiner* — Sharon Lynch
(74) *Attorney, Agent, or Firm* — Morgan, Lewis & Bockius LLP

(57) ABSTRACT

Embodiments of the present disclosure disclose a method for dynamically adjusting a program login interface. The method includes: displaying a preset flash on a program login interface; detecting a user operation within a preset area in the login interface; and updating the displayed flash according to the user operation within the preset area. The embodiments of the present disclosure further disclose a computing terminal. During implementation of the embodiments of the present disclosure, dynamic interaction may be achieved in the program login interface, and more abundant content may be provided.

12 Claims, 4 Drawing Sheets

(51) Int. Cl.
  *G06F 21/31*   (2013.01)
  *H04L 29/06*   (2006.01)
  *G06F 21/45*   (2013.01)
  *G06Q 99/00*   (2006.01)

(56) References Cited

U.S. PATENT DOCUMENTS

| | | | | |
|---|---|---|---|---|
| 7,068,189 | B2* | 6/2006 | Brescia | H04L 29/06 340/531 |
| 7,937,380 | B2* | 5/2011 | Spiegelman | G06F 17/30867 707/705 |
| 8,280,979 | B2* | 10/2012 | Kunz | G06Q 10/06 709/200 |
| 8,458,775 | B2* | 6/2013 | Lester | G06F 21/31 713/152 |
| 9,202,233 | B1* | 12/2015 | Siegel | G06Q 30/0252 |
| 2002/0138619 | A1* | 9/2002 | Ramaley | H04L 29/06027 709/226 |
| 2003/0006912 | A1* | 1/2003 | Brescia | H04L 29/06 340/990 |
| 2004/0015824 | A1* | 1/2004 | Felkey | G06Q 10/087 717/104 |
| 2004/0168092 | A1* | 8/2004 | Adachi | G06F 21/31 726/6 |
| 2005/0187956 | A1* | 8/2005 | Sylvester | G06Q 10/10 |
| 2006/0216683 | A1* | 9/2006 | Goradia | G09B 7/02 434/322 |
| 2007/0250920 | A1* | 10/2007 | Lindsay | G06F 21/31 726/7 |
| 2008/0046983 | A1* | 2/2008 | Lester | G06F 21/31 726/5 |
| 2009/0259588 | A1* | 10/2009 | Lindsay | G06F 21/31 705/40 |
| 2010/0024010 | A1* | 1/2010 | Baugher | H04M 1/72561 726/5 |
| 2010/0058045 | A1 | 3/2010 | Borras et al. | |
| 2011/0246880 | A1* | 10/2011 | Horton | G06F 9/4446 715/708 |
| 2012/0136718 | A1* | 5/2012 | Katti | G06Q 30/0251 705/14.49 |
| 2012/0238248 | A1* | 9/2012 | Jonsson | G06Q 10/1095 455/413 |
| 2013/0226974 | A1* | 8/2013 | Cosic | G06F 17/3056 707/805 |
| 2013/0326605 | A1* | 12/2013 | Betz | G06F 21/31 726/7 |
| 2014/0068456 | A1* | 3/2014 | Chan | G06F 9/4443 715/747 |
| 2014/0096272 | A1* | 4/2014 | Makofsky | G06F 21/31 726/34 |
| 2016/0219313 | A1* | 7/2016 | Ellis | G11B 27/005 |

FOREIGN PATENT DOCUMENTS

| | | | |
|---|---|---|---|
| CN | 102411623 A | | 4/2012 |
| CN | 102821197 A | | 12/2012 |
| CN | 103078923 A | | 5/2013 |
| WO | WO 2006/014070 | * | 2/2006 ............ G06F 17/60 |

OTHER PUBLICATIONS

Tencent Technology, IPRP, PCT/CN2013/084864, Jun. 30, 2015, 8 pgs.

* cited by examiner

METHOD FOR DYNAMICALLY ADJUSTING PROGRAM LOGIN INTERFACE, AND INTERNET TERMINAL

RELATED APPLICATIONS

This application is a continuation application of PCT Patent Application No. PCT/CN2013/084864, entitled "METHOD FOR DYNAMICALLY ADJUSTING PROGRAM LOGIN INTERFACE, AND INTERNET TERMINAL" filed on Oct. 9, 2013, which claims priority to Chinese Patent Application No. 201210586156.3, entitled "METHOD FOR DYNAMICALLY ADJUSTING PROGRAM LOGIN INTERFACE, AND INTERNET TERMINAL" and filed on Dec. 28, 2012, both of which are incorporated by reference in their entirety.

FIELD OF THE TECHNOLOGY

The present disclosure relates to the Internet field, and in particular, to a method for dynamically adjusting a program login interface, and a computing terminal.

BACKGROUND OF THE DISCLOSURE

When using software that needs to make communication with a server, such as IM (Instant Messenger) software, users need to log in to the server by using a login interface, thereby needing to stay for a period of time in the login interface. According to impact of elements such as network conditions, and network bandwidth of network environments, stay time in the login interface maybe range from several hundred milliseconds to tens of seconds. In the existing technology, a static diagram is generally displayed on the login interface, and a simple login animation is played when a login button operation of a user is responded. The login interface cannot provide presentation of adaptive changes according to an operation action of a user or specific environments in which users use software, such as time. Abundance presented in information is not enough, and the information lacks interaction with users.

SUMMARY

According to one aspect of embodiments of the present disclosure, a method for dynamically adjusting a program login interface, and a computing terminal are provided. Dynamic interaction may be achieved in the login interface, and more abundant content may be provided.

According to an embodiment of the present disclosure, a method for dynamically adjusting a program login interface is provided. The method includes: displaying a preset flash on a program login interface; detecting a user operation within a preset area in the login interface; and updating the displayed flash according to the user operation within the preset area.

According to another embodiment of the present disclosure, a computing terminal is provided, including: a flash display module, configured to display a preset flash on a program login interface; an operation interception module, configured to detect a user operation within a preset area in the login interface; and a dynamic adjustment module, configured to update the displayed flash according to the operation of the user in the preset area.

During implementation of the embodiments of the present disclosure, a flash displayed on the login interface may be dynamically adjusted by acquiring the operation of the user in the preset area in the login interface, thereby achieving that more dynamic and more abundant content is displayed on the login interface to attract attention of users.

BRIEF DESCRIPTION OF THE DRAWINGS

To describe the technical solutions of the embodiments of the present disclosure or the prior art more clearly, the following briefly introduces the accompanying drawings required for describing the embodiments or the prior art. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following further clearly describes the technical solutions in the embodiments of the present disclosure in detail with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The computing terminal mentioned in the embodiments of the present disclosure may be a terminal that may access the Internet, such as a personal computer, a tablet computer, a mobile phone, a smart phone, an e-reader, a notebook computer, or an on-board device; the program mentioned in the embodiments of the present disclosure may be a software program that needs to make communication with a server, such as IM software, and needs to log in to the server by using a login interface; and the flash mentioned in the embodiments of the present disclosure is a standard of an interactive vector diagram and a Web webpage animation launched by a macromedia firm. The flash is widely used for creating application programs that attract people, and may include abundant elements such as a video, a sound, a figure, or an animation.

Figure 1:
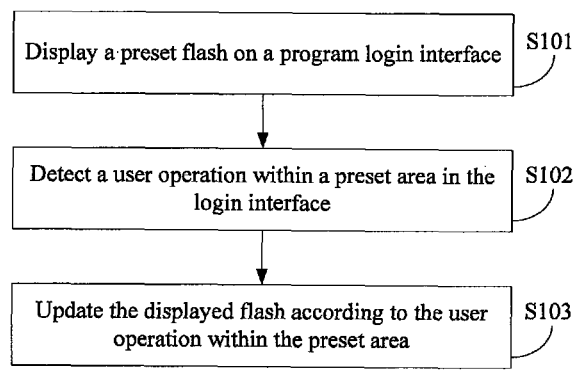
FIG. 1 is a schematic flowchart of a method for dynamically adjusting a program login interface according to an embodiment of the present disclosure.

FIG. 1 is a schematic flowchart of a method for dynamically adjusting a program login interface according to an embodiment of the present disclosure. As shown in the figure, the method for dynamically adjusting a program login interface according to this embodiment of the present disclosure may include the following steps.

S101: Display a preset flash on a program login interface.

Figure 8:
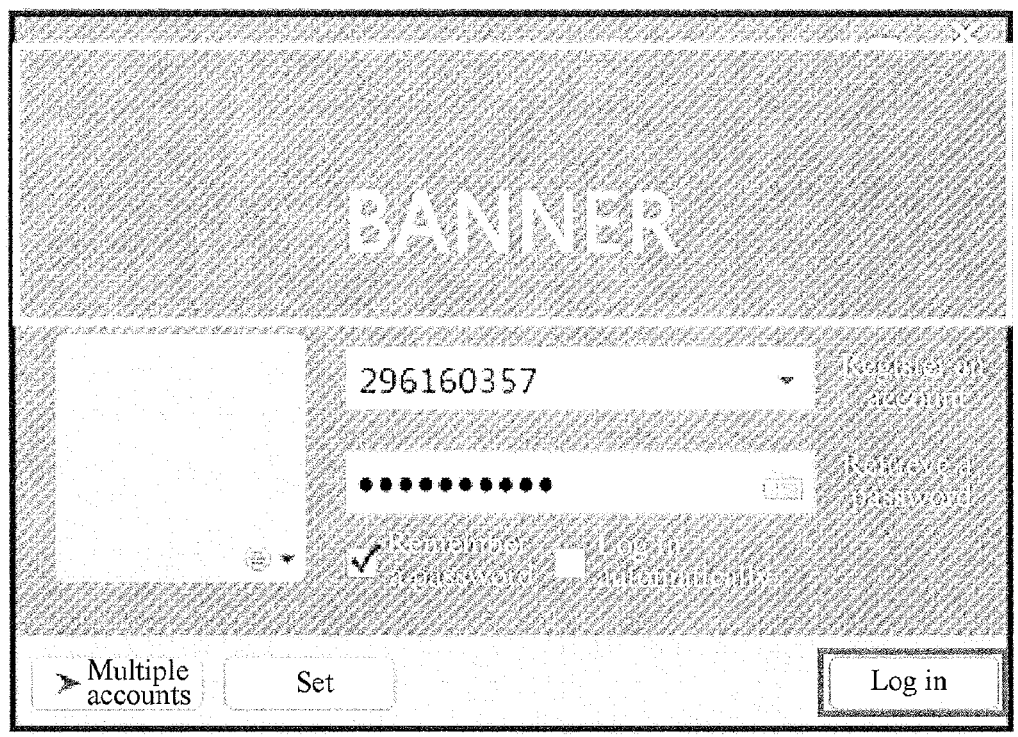
FIG. 8 is a schematic diagram of a program login interface according to an embodiment of the present disclosure.

The program login interface in this embodiment of the present disclosure may be as shown in FIG. 8. The preset flash is displayed on the login interface, where the preset flash may be a pre-acquired flash delivered by a server, and may also be a user-defined created or edited and modified flash; the preset flash may include multiple static or dynamic flash files; and one or more flashes may be displayed on the program login interface at the same time, and different flashes may also be chosen to display according to different time periods or dates.

S102: Detect a user operation within a preset area in the login interface.

For example, an area of a banner part in the program login interface shown in FIG. 8 may be the preset area. After the login interface is opened, an operation of the user in the area may start to be intercepted, such as a mouse click on a personal computer, a moving pass, a wheel operation when the mouse stays in the area, a touch click and a mouse-over on a touch-screen mobile terminal, or the like.

S103: Update the displayed flash according to the user operation within the preset area.

Specifically, different flashes displayed on the program login interface or states of the flashes displayed on the login interface may be changed according to the operation of the user in the preset area. For example, the displayed flash is preset to have four different states: a state is a state A by default when the displayed flash is opened; the state is adjusted to a state B when a user hovers over the preset area; the state is adjusted to a state C when the user clicks the preset area; and the displayed flash may be cyclically switched between multiple states when the user stays the mouse in the preset area and rolls a scroll wheel, or the like. Another alternative means of updating the displayed flash according to the user operation within the preset area on the basis of this embodiment conceived of by a person skilled in the art without creative efforts shall fall within the scope of the present disclosure.

Figure 2:
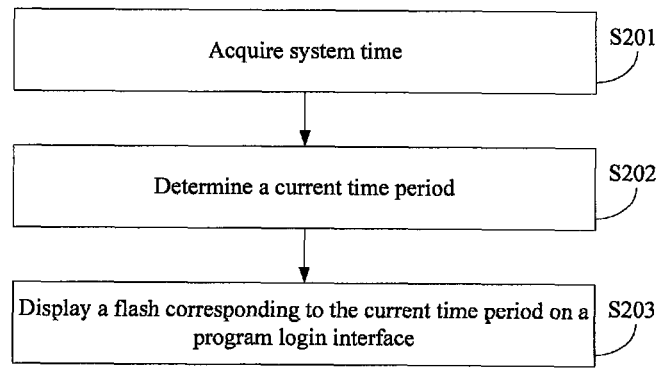
FIG. 2 is a schematic flowchart of another method for dynamically adjusting a program login interface according to an embodiment of the present disclosure.

FIG. 2 is a schematic flowchart of another method for dynamically adjusting a program login interface according to an embodiment of the present disclosure. As shown in the figure, the method process according to this embodiment includes the following steps.

S201: Acquire system time.

Specifically, a computing terminal may acquire time of its operating system, and may also acquire current system time from the server.

S202: Determine a current time period.

During specific implementation, multiple time periods may be preset, such as morning: 6:00-12:00, afternoon: 12:00-18:00, evening 18:00-24:00, and wee hours: 0:00-6:00; multiple time periods are divided into morning, noon, afternoon, and evening; or the like. Which time period of the preset multiple time periods to which current time belongs is determined according to the system time acquired in S201.

S203: Display a flash corresponding to a current time period.

Specifically, multiple flash files or states may be preset to be respectively corresponding to the multiple preset time periods. For example, the foregoing morning time period is corresponding to a flash file A or a state a; the afternoon time period is corresponding to a flash file B or a state b; the evening time period is corresponding to a flash C file or a state c; and the wee hours time period is corresponding to a flash D file or a state d. A corresponding flash file may be determined to be displayed according to a time period to which the current time belongs, or a state of the preset flash corresponding to the current time period is displayed.

Figure 3:
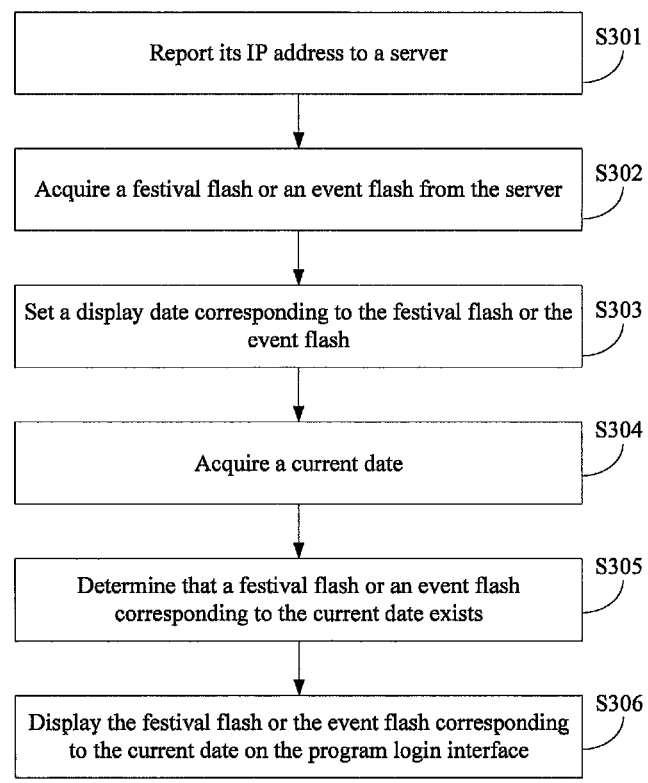
FIG. 3 is a schematic flowchart of still another method for dynamically adjusting a program login interface according to an embodiment of the present disclosure.

FIG. 3 is a schematic flowchart of another method for dynamically adjusting a program login interface according to an embodiment of the present disclosure. As shown in the figure, the method process according to this embodiment includes the following steps.

S301: Report its Internet Protocol (IP) address to the server.

During specific implementation, the computing terminal may report its IP address (which may refer to a network address of a unique identifier network terminal) to the server in a logged-in state.

S302: Acquire a festival flash or an event flash from the server.

Specifically, a server side may provide the festival flash or the event flash corresponding to a certain festival or event, and may determine that an IP address of the computing terminal is an IP address corresponding to the festival flash or the event flash after acquiring the reported IP address from the computing terminal and before the festival or the event corresponding to the festival flash or the event flash arrives, which may specifically be: an area in which the computing terminal is located is determined according to the IP address. For example, it is determined according to the IP address that the computing terminal is in Shenzhen City, Guangdong Province, China, and further, it is determined that whether the area in which the computing terminal is located is related to the festival or the event, so as to determine that whether the IP address of the computing terminal is the IP address corresponding to the festival flash or the event flash. For example, the Mid-Autumn Festival is related to all domestic areas; and however, city construction 30th anniversary of Shenzhen City on Aug. 26, 2010 may be considered to be merely related to Shenzhen City but not related to other provinces and cities. After it is determined that the IP address of the computing terminal is the IP address corresponding to the festival flash or the event flash, the festival flash or the event flash may be delivered to the computing terminal before a date of the festival or the event corresponding to the festival flash or the event flash arrives.

S303: Set a display date corresponding to the festival flash or the event flash.

Specifically, the festival flash or the event flash delivered by the server may specify the corresponding display date. For example, a festival flash of the Mid-Autumn Festival in 2012 may be specified to be displayed on the program login interface on Sep. 28, 2012. The computing terminal may set the display date corresponding to the festival flash or the event flash according to a display date specified by the server, and may also set the display date corresponding to the festival flash or the event flash according to user defining.

S304: Acquire a current date.

Specifically, a computing terminal may acquire a date of its operating system, and may also acquire a current system date from the server.

S305: Determine that a festival flash or an event flash corresponding to the current date exists.

Specifically, for example, the computing terminal sets a display date corresponding to a flash in S303, it may be searched for that whether a corresponding display date being a flash of that day, i.e., the festival flash or the event flash corresponding to the current date, exists according to the current date when a program opens the login interface.

S306: Display the festival flash or the event flash corresponding to the current date on the program login interface.

Figure 4:
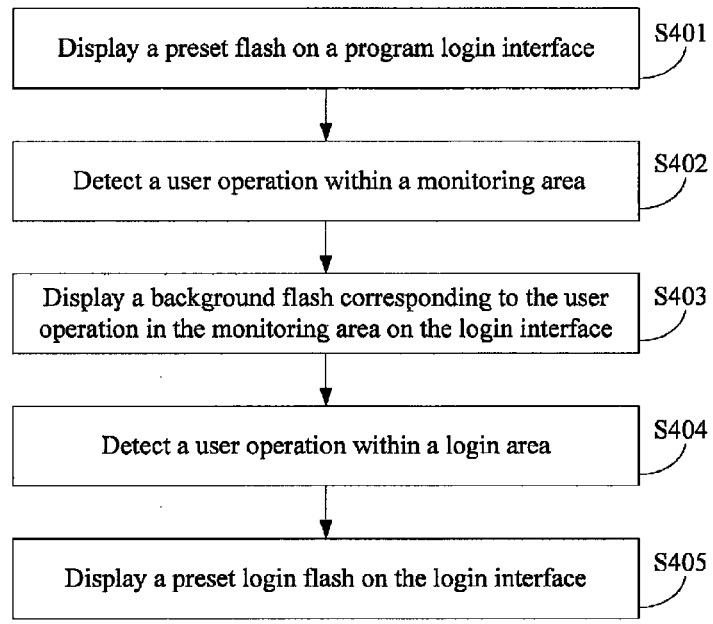
FIG. 4 is a schematic flowchart of yet another method for dynamically adjusting a program login interface according to an embodiment of the present disclosure.

FIG. 4 is a schematic flowchart of another method for dynamically adjusting a program login interface according to an embodiment of the present disclosure. As shown in the figure, the method process according to this embodiment includes the following steps.

S401: Display a preset flash on a program login interface.

S402: Detect a user operation within a monitoring area in the login interface.

Specifically, a preset area in the login interface in this embodiment may include the monitoring area and a login area. For example, in the login interface shown in FIG. 8, a banner area bounded by white lines may be a preset monitoring area, and a login interface area below the banner area may be a preset login area. Operations of the user in the monitoring area and the login area may be respectively acquired from the monitoring area and the login area, such as a mouse click on a personal computer, a moving pass, a wheel operation when the mouse stays in the area, a touch click and a mouse-over on a touch-screen mobile terminal, or the like.

S403: Display a background flash corresponding to the operation in the monitoring area on the login interface.

Specifically, different background flashes displayed on the program login interface or states of the background flashes displayed on the login interface may be changed according to the operation of the user in the monitoring area. Operations on a personal computer are used as examples. The displayed background flash is preset to have four different states: a state is a state A by default when the displayed flash is opened; the state is adjusted to a state B when a user hovers over the preset area; the state is adjusted to a state C when the user clicks the preset area; and the displayed background flash may be cyclically switched between multiple states when the user stays the mouse in the preset area and rolls a scroll wheel.

S404: Detect a user operation within a login area in the login interface.

The operation of the user in the login area may include a click on a functional button such as "log in", "register an account", and "retrieve a password" in the login interface, an input operation in an input box, or the like.

S405: Display a login flash corresponding to the operation in the login area on the login interface.

Specifically, the login flash may be a default flash file or a default flash state of the login interface, and may be specifically the login flash corresponding to the operation in the login area. Further, optionally, after the corresponding login flash is displayed on the login interface according to the operation of the user in the login area, detection of the user operation in the monitoring area may be stopped, that is, a flash displayed on the login interface is adjusted without responding to the operation of the user in the monitoring area.

Figure 5:
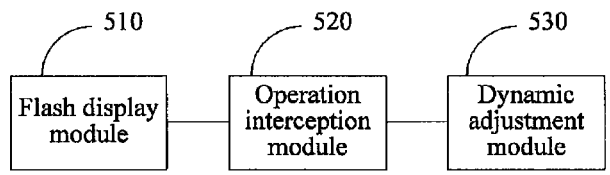
FIG. 5 is a schematic structural diagram of a computing terminal according to an embodiment of the present disclosure.

FIG. 5 is a schematic structural diagram of a computing terminal according to an embodiment of the present disclosure. As shown in the figure, the computing terminal according to this embodiment of the present disclosure may include one or more processors and memory storing a plurality of program modules, the program modules including the following modules and units.

Figure 6:
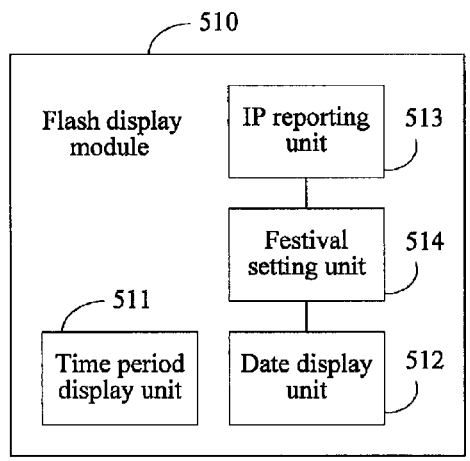
FIG. 6 is a schematic structural diagram of a flash display module 510 in a computing terminal according to an embodiment of the present disclosure.

A flash display module 510 is configured to display a preset flash on a program login interface. During specific implementation, the program login interface in this embodiment of the present disclosure may be as shown in FIG. 8. The flash display module 510 may display the preset flash on the login interface, where the preset flash may be a flash delivered by a server and pre-acquired by the flash display module 510, and may also be a user-defined created or edited and modified flash; the preset flash may include multiple static or dynamic flash files; and the flash display module 510 may display one or more flashes on the program login interface at the same time, and may also choose to display different flashes according to different time periods or dates. The flash display module 510 may further, as shown in FIG. 6, include a time period display unit 511, a date display unit 512, an IP address reporting unit 513, and a festival setting unit.

The time period display unit 511 is configured to display a flash corresponding to a current time period. During specific implementation, the time period display unit 511 may preset multiple time periods such as morning: 6:00-12:00, afternoon: 12:00-18:00, evening: 18:00-24:00, and wee hours: 0:00-6:00, or morning, noon, afternoon, and evening. Further, multiple flash files or states are set to be respectively corresponding to multiple preset time periods. For example, the foregoing morning time period is corresponding to a flash file A or a state a; the afternoon time period is corresponding to a flash file B or a state b; the evening time period is corresponding to a flash C file or a state c; and the wee hours time period is corresponding to a flash D file or a state d. The time period display unit 511 may determine to display a corresponding flash file according to a time period to which current time belongs, or display a state of the preset flash corresponding to the current time period.

The date display unit 512 is configured to display a pre-acquired flash corresponding to a current date, where the flash corresponding to the current date may include a festival flash or an event flash. The computing terminal may set a display date corresponding to a flash according to a specified flash delivered by the server or a user-defined display date of a certain flash, and it may be searched for that whether a corresponding display date being a flash of that day, i.e., the festival flash or the event flash corresponding to the current date, exists according to the current date when a program opens the login interface.

The IP address reporting unit 513 is configured to report its IP address to a server, so as to enable the server to confirm that the reported IP address is an IP address corresponding to the festival flash or the event flash. During specific implementation, the IP address reporting unit 513 may report its IP address (which may refer to a network address of a unique identifier network terminal) to the server in a program logged-in state. A server side may provide the festival flash or the event flash corresponding to a certain festival or event, and may determine that an IP address of the computing terminal is an IP address corresponding to the festival flash or the event flash after acquiring the reported IP address from the computing terminal and before the festival or the event corresponding to the festival flash or the event flash arrives, which may specifically be: an area in which the computing terminal is located is determined according to the IP address. For example, it is determined according to the IP address that the computing terminal is in Shenzhen City, Guangdong Province, China, and further, it is determined that whether the area in which the computing terminal is located is related to the festival or the event, so as to determine that whether the IP address of the computing terminal is the IP address corresponding to the festival flash or the event flash. For example, the Mid-Autumn Festival is related to all domestic areas; and however, city construction 30th anniversary of Shenzhen City on Aug. 26, 2010 may be considered to be merely related to Shenzhen City but not related to other provinces and cities.

The festival setting unit 514 is configured to acquire the festival flash or the event flash from the server, and set a display date corresponding to the festival flash or the event flash. After it is determined that the IP address of the computing terminal is the IP address corresponding to the festival flash or the event flash, the festival flash or the event flash may be delivered to the computing terminal before a date of the festival or the event corresponding to the festival flash or the event flash arrives. The festival flash or the event flash delivered by the server may specify the corresponding display date. For example, a festival flash of the Mid-Autumn Festival in 2012 may be specified to be displayed on the program login interface on Sep. 28, 2012. The computing terminal may set the display date corresponding to the festival flash or the event flash according to a display date specified by the server, and may also set the display date corresponding to the festival flash or the event flash according to user defining.

An operation interception module 520 is configured to detect a user operation within a preset area in the login interface. During specific implementation, specifically, a preset area in the login interface in this embodiment may include the monitoring area and a login area. For example, in the login interface shown in FIG. 8, a banner area bounded by white lines may be a preset monitoring area, and a login interface area below the banner area may be a preset login area. Operations of the user in the monitoring area and the login area may be respectively acquired from the monitoring area and the login area, such as a mouse click on a personal computer, a moving pass, a wheel operation when the mouse stays in the area, a touch click and a mouse-over on a touch-screen mobile terminal, or the like.

A dynamic adjustment module 530 is configured to update the displayed flash according to the operation of the user in the preset area. During specific implementation, the dynamic adjustment module 530 may change different flashes displayed on the program login interface or change states of the flashes displayed on the login interface according to the operation of the user in the preset area. For example, the displayed flash is preset to have four different states: a state is a state A by default when the displayed flash is opened; the state is adjusted to a state B when a user hovers over the preset area; the state is adjusted to a state C when the user clicks the preset area; and the displayed flash may be cyclically switched between multiple states when the user stays the mouse in the preset area and rolls a scroll wheel, or the like. Another alternative means of updating the displayed flash according to the user operation within the preset area on the basis of this embodiment conceived of by a person skilled in the art without creative efforts shall fall within the scope of the present disclosure.

Figure 7:
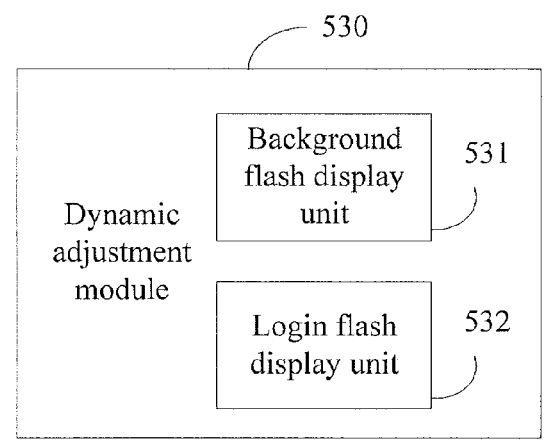
FIG. 7 is a schematic structural diagram of a dynamic adjustment module 530 in a computing terminal according to an embodiment of the present disclosure.

Further, as shown in FIG. 7, the dynamic adjustment module 530 in this embodiment of the present disclosure includes the following units.

A background flash display unit 531 is configured to display a background flash corresponding to an operation in the monitoring area on the login interface when the operation interception module 520 acquires the operation of the user in the monitoring area.

A login flash display unit 532 is configured to display a preset login flash on the login interface when the operation interception module 520 acquires an operation of the user in the login area. Specifically, the login flash may be a default flash file or a default flash state of the login interface, and may be specifically the login flash corresponding to the operation in the login area. Further, optionally, the operation interception module 520 stops acquiring the operation of the user in the monitoring area when the login flash display unit 532 displays the preset login flash.

In the embodiments of the present disclosure, a flash displayed on the login interface may be dynamically adjusted by acquiring the operation of the user in the preset area in the login interface, thereby achieving that more dynamic and more abundant content is displayed on the login interface to enhance user experience of using a product.

A person of ordinary skill in the art may understand that all or some of the processes of the methods in the foregoing embodiments may be implemented by a computer program instructing relevant hardware. The program may be stored in a non-transitory computer readable storage medium. During the execution of the program, processes of the foregoing method embodiments may be included. The non-transitory computer storage medium may be a magnetic disk, an optical disc, a read-only memory (ROM), a random access memory (RAM) or the like.

The foregoing descriptions are merely specific embodiments of the present disclosure, but are not intended to limit the present disclosure. The protection scope of the present disclosure is defined by the appended claims. Any modification, replacement, or improvement made within the spirit and principle of the present disclosure shall fall within the scope of the appended claims.

What is claimed is:

1. A method for dynamically adjusting a program login interface, comprising:
   at a computing terminal having one or more processors and memory storing a plurality of program modules to be executed by the one or more processors:
   reporting an Internet Protocol (IP) address of the computing terminal to a server, so as to enable the server to confirm that the reported IP address corresponds to a geological area within which a festival or event will take place, wherein the server has respective flash content that corresponds to the festival or event;
   receiving the respective flash content that corresponds to the festival or event from the server after the server confirms that the reported IP address corresponds to the geological area and before a date on which the festival or event will take place;
   displaying a preset flash on a program login interface, including concurrently displaying a background flash and a login flash in the program login interface, wherein displaying the preset flash further comprises displaying the respective flash content on the program login interface when the date on which the festival or event will take place corresponds with a current date;
   detecting a user operation within a preset area in the program login interface; and
   updating the displayed preset flash according to the user operation within the preset area, including:
      in accordance with a determination that the user operation is detected in a monitoring area of the program login interface, updating the background flash in the program login interface; and
      in accordance with a determination that the user operation is detected in a login area of the program login interface, distinct from the monitoring area of the program login interface, updating the login flash in the program login interface.

2. The method according to claim 1, wherein the step of displaying the preset flash on the program login interface further comprises:
displaying the preset flash corresponding to a current time period.

3. The method according to claim 1, wherein the preset area in the program login interface comprises at least one area selected from the monitoring area and the login area.

4. The method according to claim 1, wherein, after updating the login flash in the login area based on the user operation detected in the login area, the method further comprises suspending detecting a user operation in the monitoring area.

5. A computing terminal comprising:
one or more processors;
memory; and
a plurality of programs stored in the memory to be executed by the one or more processors, the plurality of programs further including instructions for:
reporting an Internet Protocol (IP) address of the computing terminal to a server, so as to enable the server to confirm that the reported IP address corresponds to a geological area within which a festival or event will take place, wherein the server has respective flash content that corresponds to the festival or event:
receiving the respective flash content that corresponds to the festival or event from the server after the server confirms that the reported IP address corresponds to the geological area and before a date on which the festival or event occurs;
displaying a preset flash on a program login interface, including concurrently displaying a background flash and a login flash in the program login interface, wherein displaying the preset flash further comprises displaying the respective flash content on the program login interface when the date on which the festival or event will take place corresponds with a current date;
detecting a user operation within a preset area in the program login interface; and
updating the displayed preset flash according to the operation of the user in the preset area, including:
in accordance with a determination that the user operation is detected in a monitoring area of the program login interface, updating the background flash in the program login interface; and
in accordance with a determination that the user operation is detected in a login area of the program login interface, distinct from the monitoring area of the program login interface, updating the login flash in the program login interface.

6. The computing terminal according to claim 5, wherein the plurality of programs further include instructions for:
displaying the preset flash corresponding to a current time period.

7. The computing terminal according to claim 5, wherein the preset area in the program login interface comprises at least one area selected from the monitoring area and the login area.

8. The computing terminal according to claim 5, wherein the plurality of programs further include instructions for:
after updating the login flash in the login area based on the user operation detected in the login area, suspending detecting a user operation in the monitoring area.

9. A non-transitory computer readable storage medium storing one or more instructions, which, when executed by a computing terminal, cause the computer terminal to:
report an Internet Protocol (IP) address of the computing terminal to a server, so as to enable the server to confirm that the reported IP address corresponds to a geological area within which a festival or event will take place, wherein the server has respective flash content that corresponds to the festival or event;
receive the respective flash content that corresponds to the festival or event from the server after the server confirms that the reported IP address corresponds to the geological area and before a date on which the festival or event will take place;
display preset flash on a program login interface, including concurrently displaying a background flash and a login flash in the program login interface, wherein the respective flash content is displayed on the program login interface when the date on which the festival or event will take place corresponds with a current date;
detect a user operation within a preset area in the program login interface; and
update the displayed preset flash according to the user operation within the preset area, including:
in accordance with a determination that the user operation is detected in a monitoring area of the program login interface, updating the background flash in the program login interface; and
in accordance with a determination that the user operation is detected in a login area of the program login interface, distinct from the monitoring area of the program login interface, updating the login flash in the program login interface.

10. The non-transitory computer readable storage medium of claim 9, wherein the one or more instructions, when executed by the computer terminal, further causes the computer terminal to:
display the preset flash corresponding to a current time period.

11. The non-transitory computer readable storage medium of claim 9, wherein the preset area in the program login interface comprises at least one area selected from the monitoring area and the login area.

12. The non-transitory computer readable storage medium of claim 9, wherein, the one or more instructions, when executed by the computer terminal, further causes the computer terminal to:
after updating the login flash in the login area based on the user operation detected in the login area, suspend detecting a user operation in the monitoring area.

* * * * *